United States Patent [19]
Wright, Jr. et al.

[11] Patent Number: 5,413,499
[45] Date of Patent: May 9, 1995

[54] BATTERY HOLDER

[75] Inventors: Austin J. Wright, Jr., Aurora; Joseph P. Pecukonis, Englewood, both of Colo.

[73] Assignee: Amprobe Instrument, Lynbrook, N.Y.

[21] Appl. No.: 135,022

[22] Filed: Oct. 12, 1993

[51] Int. Cl.[6] .............................................. H01R 3/00
[52] U.S. Cl. ........................................ 439/500; 429/1; 429/98
[58] Field of Search .................. 439/500; 429/97–100, 429/1, 121, 7, 9

[56] References Cited

U.S. PATENT DOCUMENTS

| | | | |
|---|---|---|---|
| 3,855,534 | 12/1974 | Holcomb et al. | 429/98 |
| 3,969,148 | 7/1976 | Trattner | 429/100 |
| 4,129,688 | 12/1978 | Fischer et al. | 439/500 |
| 4,138,531 | 2/1979 | Thompson | 429/98 |

*Primary Examiner*—David L. Pirlot
*Attorney, Agent, or Firm*—John R. Ley; John B. Phillips; John R. Ley

[57] ABSTRACT

A battery holder retains and electrically connects a battery to electrical contacts contained within a housing of an electrical device. The battery holder includes a battery drawer which receives the battery and positions the battery within the housing of the electrical device. The battery drawer includes a rear end wall defining apertures for receiving the terminals of the battery. Pivotable connecting means allow the battery drawer to move within an opening defined in the housing between an open position for receiving the battery and a closed position wherein the drawer and battery are received within the housing. A cam surface within the housing contacts the battery as the drawer is closed and biases the battery against the rear end wall of the drawer to effect engagement of the terminals with the electrical contacts in the housing through the apertures in the rear end wall of the drawer. The apertures are adapted to prevent the battery terminals from being connected to the incorrect electrical contact (i.e. contact of opposite polarity) within the housing. No component of the battery holder may be completely detached from the housing of the electrical device.

21 Claims, 3 Drawing Sheets

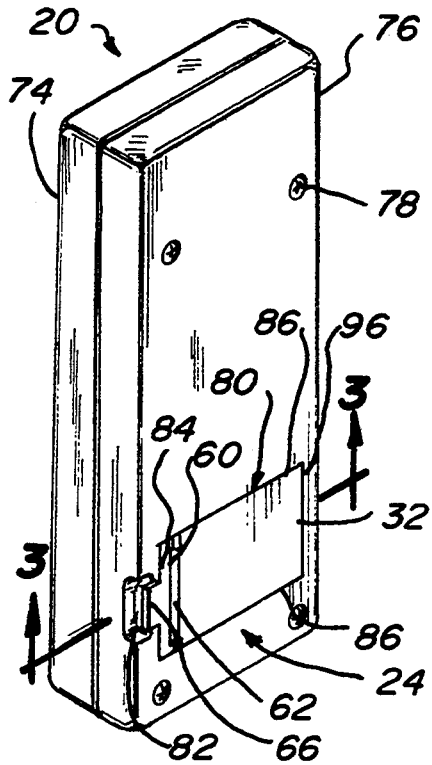
Fig_1
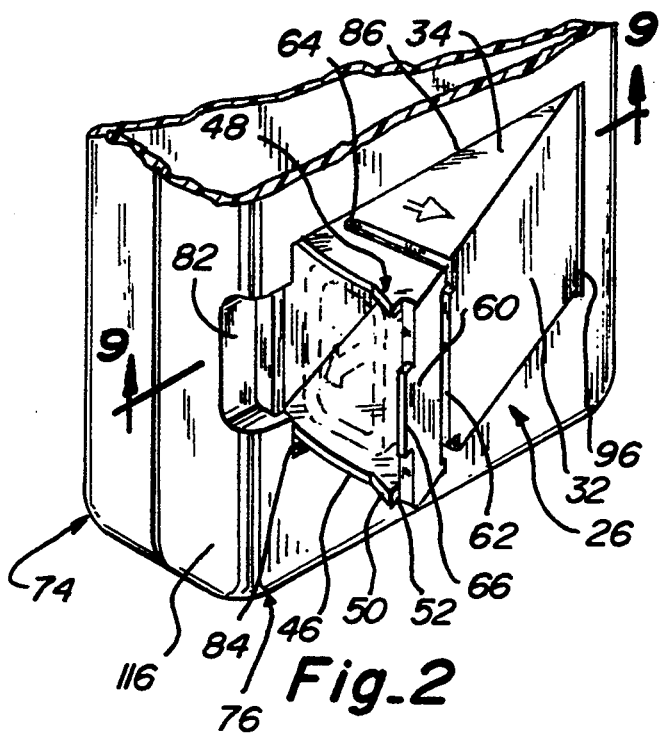
Fig_2
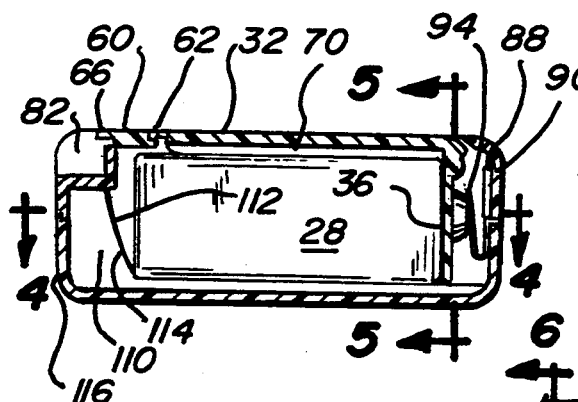
Fig_3
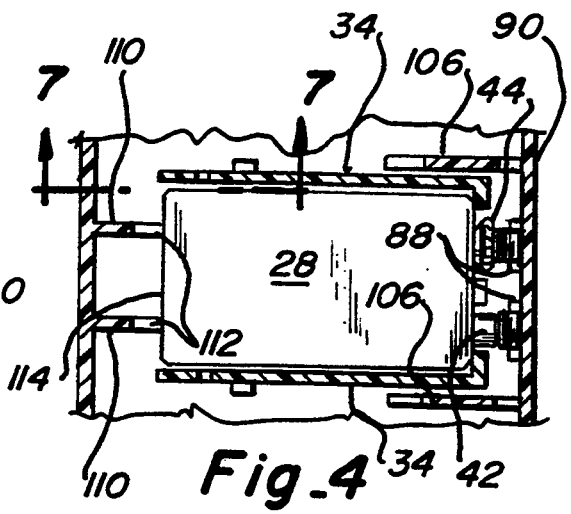
Fig_4
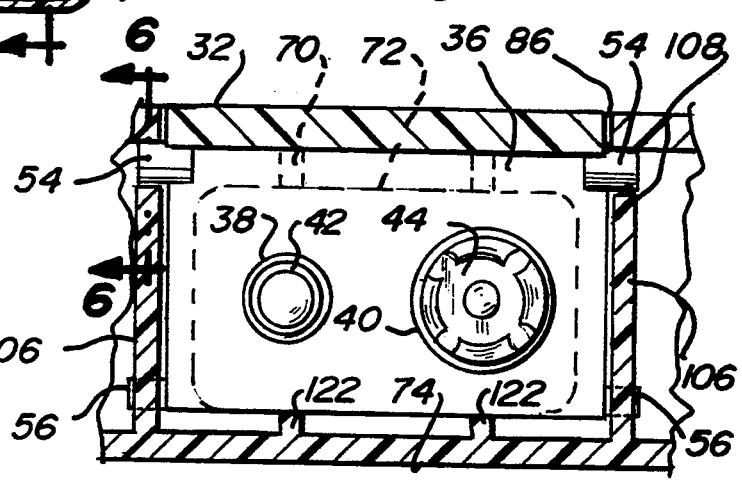
Fig_5

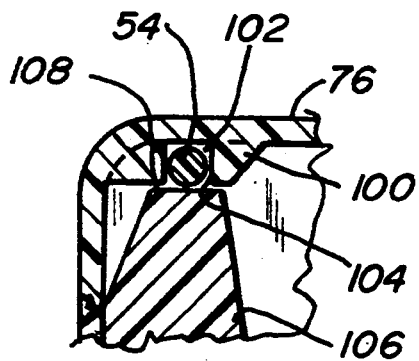
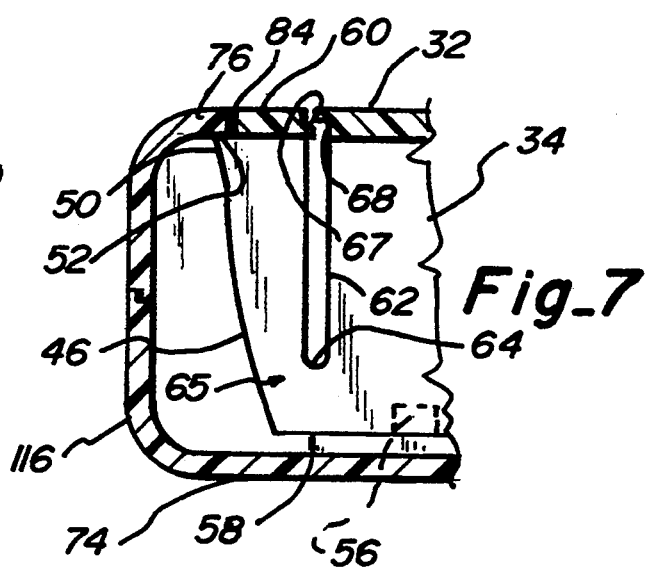
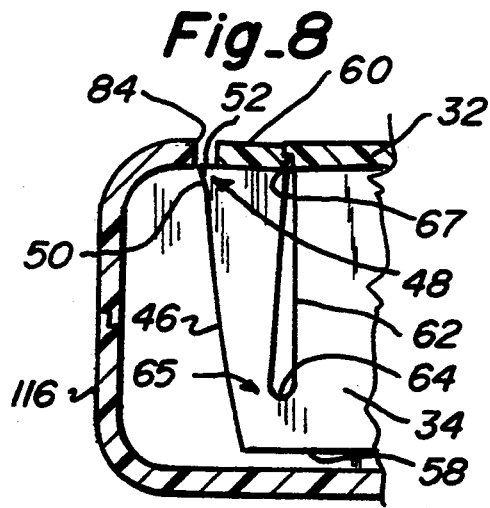
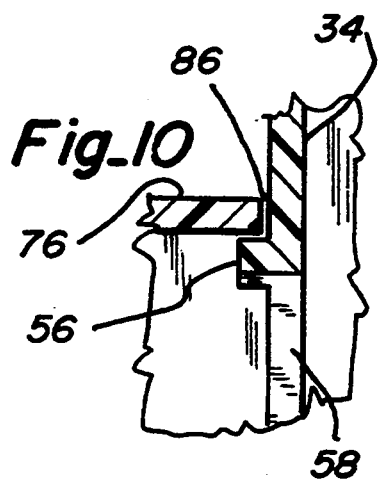
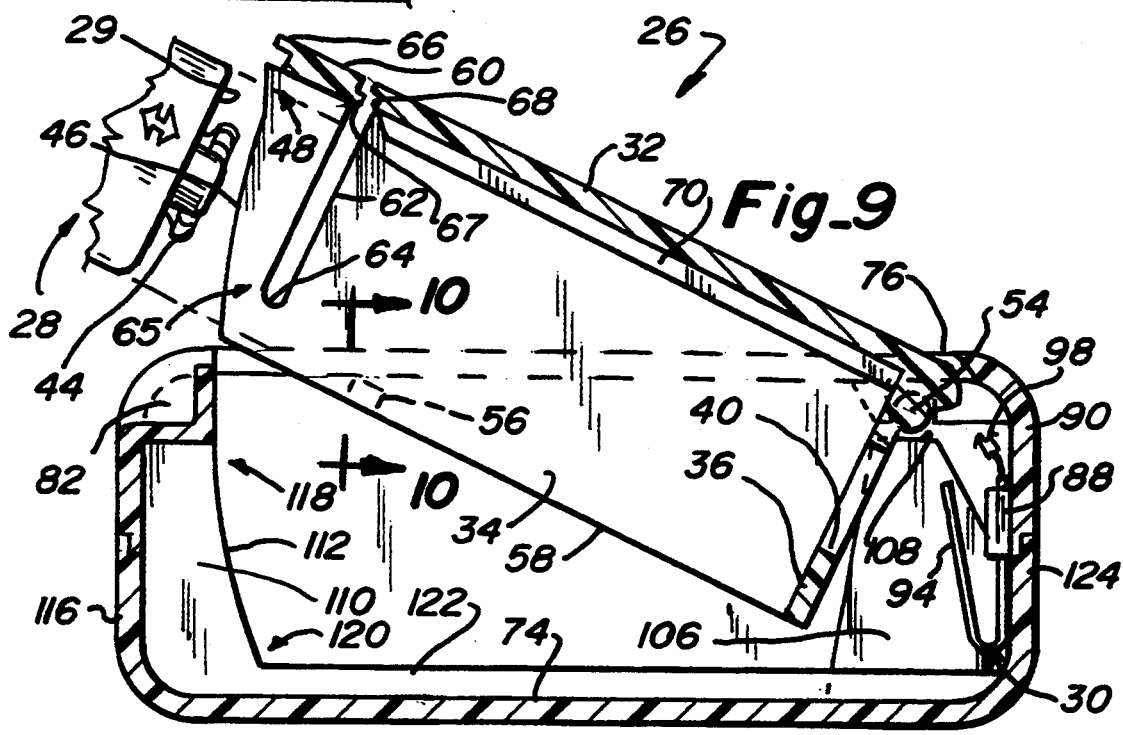

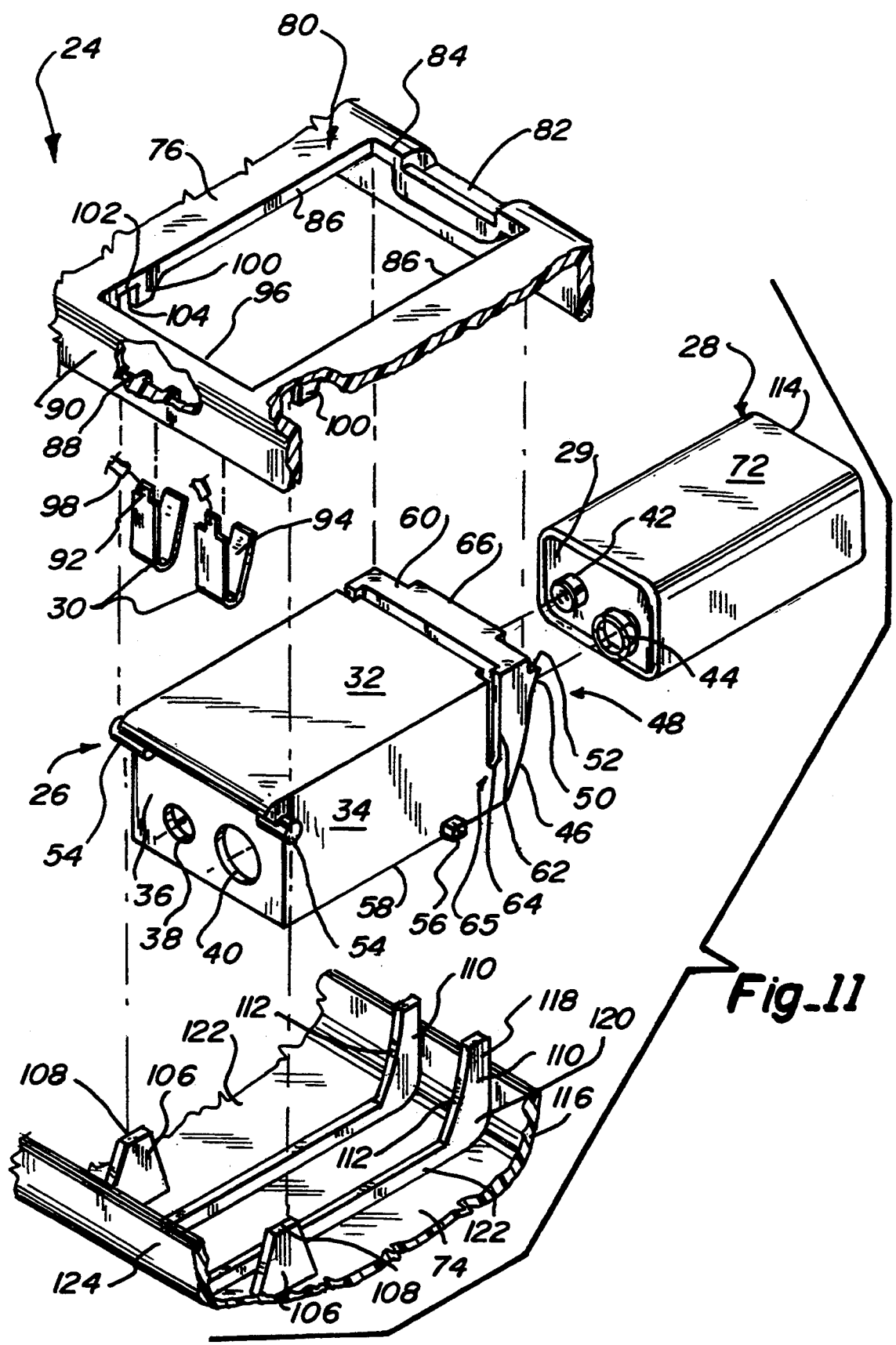
Fig._11

BATTERY HOLDER

FIELD OF THE INVENTION

This invention relates to batteries and more particularly to battery holders. More specifically, the present invention relates to a holder for removably retaining and electrically connecting a battery within an electrical device.

BACKGROUND OF THE INVENTION

Battery compartments for retaining one or more batteries within an electrical device and electrically connecting the batteries to the device are well known. Battery compartments typically utilize a cover plate which must be completely detached from the electrical device before a battery can be inserted within or removed from the compartment. Detachable cover plates are subject to becoming lost during battery replacement or during use of the electrical device should the cover plate open unintentionally.

Many electrical devices utilize nine volt batteries wherein both the positive and negative terminals are fixed to one end of the battery. Such electrical devices typically utilize only a single nine volt battery, and thus it is not uncommon for these devices to require frequent battery changes. Nine volt batteries are typically connected to electrical devices via a small connector cap which contains the electrical contacts for both the positive and negative terminals. Fine lead wires fixed to the connector are typically used to complete the connection to the circuitry within the device. Thus, loading or replacing a nine volt battery within a typical battery compartment entails detaching the cover plate from the electrical device and removing the connector and wires from the compartment. Once the connector is manually placed over the battery terminals, the battery, the connector and the lead wires are loaded within the battery compartment and the cover plate is reattached to the device. However, fitting the connector over both terminals may frequently be difficult due to imprecise tolerances in the manufacture of both the connector and the batteries themselves. Furthermore, the fine lead wires between the connector and the circuitry are easily damaged and may fail under continued use of the electrical device. Thus, battery compartments for nine volt batteries currently suffer from a number of difficulties which are often compounded by frequent battery replacements.

It is with regard to this background information that the improvements available from the present invention have evolved.

OBJECTS AND SUMMARY OF THE INVENTION

It is the principal object of the present invention to provide an improved battery holder for use with electrical devices.

Another object of the present invention is to provide an improved battery holder which may be used to quickly and easily retain and electrically connect a battery within an electrical device.

A further object of the present invention is to provide an improved battery holder which utilizes no components that may be completely detached from the electrical device to prevent loss or misplacement of such components.

A further object of the present invention is to provide an improved battery holder of the foregoing type for connecting a nine volt battery to electrical contacts fixed within an electrical device to thereby enhance the durability and life span of the electrical device.

Still another object of the present invention is to provide an improved battery holder which prevents the battery from being connected incorrectly (i.e. with reverse polarity) to the electrical contacts within the electrical device.

In accordance with these and other objects, the present invention is embodied in a battery holder for retaining a battery within a housing of an electrical device and for electrically connecting the battery to electrical contacts contained within the housing. The battery holder finds particular but not exclusive use with batteries having both a positive and a negative terminal fixed to one end of the battery, such as nine volt batteries.

The battery holder includes several components. First, a battery drawer receives the battery and positions the battery properly within the housing of the electrical device. The battery drawer includes a rear end wall defining a first aperture adapted to receive the positive terminal of the battery and a second aperture adapted to receive the negative terminal of the battery. Secondly, the battery holder includes means for pivotably connecting the battery drawer within an opening defined in the housing, for movement between an open position in which the drawer extends outside the housing for receiving the battery, and a closed position in which the drawer and the battery are received within the housing. The connecting means preferably comprises a hinge pin connected to the battery drawer and means within the housing for pivotably retaining the pin. Next, a cam surface is positioned within the housing to contact the battery as the battery drawer is closed and bias the battery against the rear end wall of the battery drawer. The cam surface engages the battery to maintain the positive and negative battery terminals within their respective apertures in the rear end wall and thereby effect engagement of the terminals with the electrical contacts in the housing.

The pivotable connection of the battery drawer to the housing of the electrical device precludes the battery drawer from being completely detached from the housing. Thus, no component of the battery holder is subject to being lost or misplaced during use of the electrical device or during replacement of the battery. Additionally, each aperture defined in the rear end wall of the battery drawer is adapted to receive only its respective battery terminal. Thus, it is not possible to incorrectly connect the battery within the electrical device. Furthermore, the electrical contacts and the lead wires between the contacts and the electrical device are fixed within the housing and thus are not likely to be damaged, even when the electrical device is subjected to continual use and numerous battery changes.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is a perspective view of a housing of an electrical device including a battery holder embodying the present invention.

FIG. 2 is an enlarged perspective view of a portion of the housing illustrated in FIG. 1, showing the battery holder in an open position, and with an inserted battery shown in phantom.

FIG. 3 is an enlarged section view taken substantially in the plane of line 3—3 in FIG. 1, showing a nine volt battery contained within the battery holder.

FIG. 4 is a partial section view taken substantially in the plane of line 4—4 in FIG. 3.

FIG. 5 is an enlarged section view taken substantially in the plane of line 5—5 in FIG. 3.

FIG. 6 is a section view taken substantially in the plane of line 6—6 in FIG. 5.

FIG. 7 is an enlarged section view taken substantially in the plane of line 7—7 in FIG. 4, illustrating a latch on the battery holder engaged with an interior surface of the housing.

FIG. 8 is an enlarged section view similar to FIG. 7, showing a portion of the battery holder compressed to disengage the latch from the interior surface of the housing.

FIG. 9 is an enlarged section view taken substantially in the plane of line 9—9 in FIG. 2, but showing the nine volt battery withdrawn from the battery holder.

FIG. 10 is an enlarged section view taken substantially in the plane of line 10—10 in FIG. 9.

FIG. 11 is an exploded perspective view of the nine volt battery and the battery holder illustrated in FIGS. 1—3, showing a portion of a top and bottom shell of the housing and a pair of electrical contacts contained within the housing.

DESCRIPTION OF THE PREFERRED EMBODIMENT

Referring to FIG. 1, a molded housing 20 for a small electrical device incorporates a battery compartment 22 in which a battery holder 24 embodying the present invention is mounted. The battery holder 24 includes a battery drawer 26 pivotably connected to the housing 20 to swing between a closed position within the battery compartment 22, as shown in FIG. 1, and an open position extending outside the battery compartment 22, as shown in FIG. 2. When the battery drawer 26 is in the open position, a battery 28 may be loaded into or removed from the battery drawer 26 (FIG. 9). Although a typical nine volt battery is shown, the battery holder 24 may be used with any battery or battery pack having both terminals fixed to a first end 29 of the battery. When the battery 28 is properly oriented within the battery drawer 26, the drawer may be closed to retain the battery securely within the battery compartment 22 and engage the battery terminals with electrical contacts 30 contained within the housing 20, as shown in FIG. 3.

The battery drawer 26 includes a bottom wall 32, opposing side walls 34 and a rear end wall 36 connected together as shown in FIG. 11 to form a rectangular chamber of sufficient size to receive the battery 28. The rear end wall 36 defines a first aperture 38 and a second aperture 40 for respectively receiving a positive and a negative battery terminal 42 and 44. The battery terminals 42 and 44 are substantially round, with the negative terminal 44 having a larger diameter than the positive terminal 42. To accommodate the battery terminals 42 and 44, the apertures 38 and 40 are preferably round, with the diameter of the first aperture 38 preferably smaller than the diameter of the second aperture 40 to prevent the first aperture 38 from receiving the larger negative terminal 44.

Each side wall 34 of the battery drawer 26 has a forward edge 46 with a latch 48 fixed thereto for releasably latching the battery drawer 26 to the housing 20, as shown in FIGS. 2, 7-9 and 11. Each latch 48 includes a cam surface 50 and a flat engaging surface 52 that are described in greater detail below. Additionally, the battery drawer 26 includes two cylindrical hinge pins 54 for pivotably connecting the battery drawer 26 to the housing 20. The hinge pins 54 are preferably fixed to the battery drawer 26 at the juncture of the bottom wall 32, the rear end wall 36 and each side wall 34, as shown in FIG. 11. Furthermore, two retaining pins 56 for limiting the opening motion of the battery drawer 26 are fixed to an exterior surface of each side wall 34 along a top edge 58 of the side wall, as shown in FIG. 11.

A latching mechanism for releasably latching the battery drawer 26 in the closed position includes a forward section 60 which is separated from the bottom wall 32 of the battery drawer by a contiguous slot 62 (FIGS. 2, 7-9 and 11) which extends parallel to the rear end wall 36 between a terminal point 64 in one side wall 34 of the battery drawer and a terminal point in the opposite side wall. The forward section 60 connects the forward edges 46 of the side walls 34 so that the latches 48 move with the forward section 60. The relative positions of the forward section 60 and the bottom wall 32 are maintained by hinge portions 65 of the side walls 34 adjacent the terminal points 64 of the slot 62, as shown in FIG. 11. The battery drawer 26 is preferably molded from a stiffly resilient plastic to provide a spring bias to the hinge portions 65. Applying a force to the forward section 60 in the direction of the rear end wall 36 of the battery drawer 26 tends to compress the spring biased hinge portions 65 and move the forward section 60 toward the bottom wall 32 to release the latches 48 from the housing 20. A release tab 66 for facilitating the application of such a force is attached to the forward section 60 opposite the slot 62. Additionally, a flange 67 for keeping debris out of the slot 62 is attached to the forward section 60 and extends toward the bottom wall 32 across the slot 62, as shown in FIG. 7. A recess 68 formed within the bottom wall receives the flange 67 when the hinge portions 65 of the side walls 34 are compressed and the forward section 60 is forced together with the bottom wall 32, as shown in FIG. 8. Furthermore, a pair of parallel support ribs 70 for contacting and supporting a bottom surface 72 of the battery 28 are attached to an interior surface of the bottom wall 32 and extend between the rear end wall 36 and the recess 68 in the bottom wall 32, as shown in FIGS. 5 and 8.

The housing 20 of the electrical device conventionally comprises a top shell 74 and a bottom shell 76 joined together by screws or fasteners 78 as shown in FIGS. 1-3, 8, 9 and 11. The top and bottom shells 74 and 76 may be molded or otherwise formed from plastic for ease of manufacture.

An opening 80 for receiving the battery drawer 26 is formed in the bottom shell 76, as shown in FIGS. 1, 2 and 11. The opening 80 is generally shaped to accommodate the battery configuration and, in the form shown, is rectangular. A recess 82 formed in the bottom shell 76 adjacent a forward edge 84 of the opening 80 facilitates access to the battery drawer 26, as shown in FIGS. 1-3 and 11. The recess 82 is centered between opposing side edges 86 of the opening and is of sufficient size to receive a thumb or a finger therein for opening the battery drawer 26.

Guides 88 on a rear wall 90 of the bottom shell retain a first end 92 of the electrical contacts as shown in FIGS. 3, 9 and 11, while a second end 94 of each electrical contact extends toward a rear edge 96 of the opening 80. Electrical lead wires 98 attached to each first end 92 of the electrical contacts (FIGS. 9 and 11) connect the electrical contacts to the electrical device (not shown) contained within the housing 20.

The battery holder 24 includes means for pivotably retaining the cylindrical hinge pins 54 attached to the battery drawer 26. Preferably, the bottom shell 76 includes two hinge pin covers 100 formed along the opposing side edges 86 of the opening 80 adjacent the rear edge 96 of the opening as shown in FIG. 11. Each hinge pin cover 100 defines a hinge pin slot 102 therein which is flush with the side edge 86 of the opening 80 and which has an open end 104 that faces the top shell 74. The top shell 74 preferably includes two hinge pin retainers 106 for contacting the hinge pin covers 100 in the bottom shell 76. The hinge pin retainers 106 are preferably fixed to the top shell 74 opposite the hinge pin covers 100 and define a flat surface 108 extending toward the bottom shell 76. Upon joinder of the top and bottom shells 74 and 76, the flat surface 108 of the hinge pin retainer 106 abuts the hinge pin cover 100 to close the open end 104 of the hinge pin slot 102.

The top shell 74 also includes two ramps 110 defining cam surfaces 112 engageable with a second end 114 of the battery 28 for biasing the battery toward the electrical contacts 30 within the housing 20 as the battery drawer 26 is closed. The ramps 110 are preferably formed along a forward wall 116 of the top shell 74 as shown in FIGS. 3, 4, 9 and 11. Each cam surface 112 extends between a narrow end 118 of the ramp adjacent the recess 82 in the bottom shell and a wide end 120 of the ramp fixed to the top shell 74, as shown in FIG. 11. The cam surface 112 is substantially flush with the forward edge 84 of the opening 80 at the narrow end 118 of the ramp, but preferably curves or slopes away from the forward wall 116 of the top shell (FIGS. 3, 9 and 11) to match the arcuate path traveled by the second end 114 of the battery as the battery drawer 26 pivots to the closed position. The cam surface 112 at the wide end 120 of each ramp merges with a support rib 122 mounted on the top shell 74 (FIG. 11), and the two support ribs 122 extend parallel to one another between the wide ends 120 of the ramps 110 and a rear wall 124 of the top shell 74 to support the battery 28 within the compartment 22 as shown in FIGS. 3 and 5.

During assembly of the housing 20, the battery drawer 26 is positioned within the opening 80 in the bottom shell 76 and the hinge pins 54 are fit within the hinge pin slots 102 of the hinge pin covers 100. The top shell 74 is then connected to the bottom shell 76 so that the flat surface 108 of each hinge pin retainer 106 contacts the opposite hinge pin cover 100 to close the open end 104 of the slot 102 and pivotably retain the hinge pin 54 within the slot 102, as shown in FIG. 6.

Once the top and bottom shells 74 and 76 are joined, the battery drawer 26 is free to pivot between the open position shown in FIG. 2 and the closed position shown in FIG. 1. A maximum open position of the battery drawer 26 (FIG. 9) is defined by contact between the retaining pins 56 on the side walls 34 of the battery drawer 26 and an interior surface of the bottom shell 76 adjacent the side edges 86 of the opening, as shown in FIGS. 9 and 10. The maximum open position provides sufficient clearance for the battery 28 to be loaded within the battery drawer 26 as shown in FIGS. 2 and 9. The battery 28 is loaded with the first end 29 facing the rear end wall 36 of the battery drawer 26 to align the positive and negative terminals 42 and 44 with the first and second apertures 38 and 40, respectively, as shown in FIGS. 9 and 11. Once the battery terminals have been received within their respective apertures, the drawer 26 may be pivoted to the closed position.

If the battery 28 is loaded improperly so that the relatively large negative terminal 44 is aligned with the relatively small first aperture 38, the second end 114 of the battery 28 will not clear the forward edge 84 of the opening 80 as the battery drawer 26 is closed. Instead, the second end 114 of the battery will contact the bottom shell 76 and prevent the battery drawer 26 from pivoting to the closed position. Similarly, if the battery is loaded within the drawer 26 so that the second end 114 faces the rear end wall 36 of the drawer 26, the battery terminals will fail to clear the forward edge 84 of the opening 80 and thus prevent the battery drawer 26 from closing. Therefore, the battery drawer 26 can only be closed when the battery 28 is oriented properly within the drawer.

As the battery 28 and the drawer 26 pivot to the closed position, the cam surfaces 112 of the ramps 110 engage the second end 114 of the battery and cam the battery 28 towards the rear end wall 36 of the drawer so that the positive and negative terminals 42 and 44 remain within the first and second apertures 38 and 40, respectively. Upon reaching the closed position, the positive and negative terminals 42 and 44 engage the electrical contacts 30, as shown in FIG. 3. In the closed position, the battery 28 is held firmly within the compartment 22 to keep the terminals engaged with the electrical contacts during use of the electrical device.

When the battery drawer 26 is nearly closed, the cam surfaces 50 of the latches 48 on the forward edge 46 of the side walls 34 contact the bottom shell 76 at the forward edge 84 of the opening 80. A closing force applied to either the bottom wall 32 or the forward section 60 causes an opposing force to compress the spring biased hinge portions 65 of the side walls 34, as shown in FIG. 8. The forward section 60 is thus displaced toward the bottom wall 32 (and the flange 67 on the forward section 60 is received within the recess 68 on the bottom wall) so that the cam surfaces 50 slide past the bottom shell 76. Once the cam surfaces 50 clear the bottom shell, the compressed hinge portions 65 of the side walls 34 expand to position the flat engaging surfaces 52 of the latches 48 against the interior surface of the bottom shell 76 adjacent the forward edge 84 of the opening, as shown in FIG. 7. In the closed position, the bottom wall 32 of the battery drawer 26 is flush with the opening 80, and the flange 67 on the forward section 60 is positioned within the slot 62 to prevent debris from entering the battery compartment 22 through the slot 62, as shown in FIG. 7.

While the latching mechanism prevents the battery drawer 26 from opening unintentionally, the drawer may be opened by applying a sufficient opening force on the release tab 66 positioned within the recess 82 of the bottom shell. Once the latches 48 have been disengaged, the battery drawer 26 may be pivoted to the maximum open position to allow the battery 28 to be removed from the drawer.

The battery holder of the present invention embodies a number of improvements over prior art battery compartments. For instance, the battery drawer 26 is pivotably retained to the housing 20 to prevent the drawer being lost when it is opened. Additionally, the electrical contacts 30 and the lead wires 98 from the contacts to the electrical device are fixed to the housing 20, and thus are more durable than connectors which must be manually placed over the battery terminals prior to fitting the battery 28 within the battery compartment 22. In addition, the battery holder of the present invention is simple to use and allows for quick battery changes. To change a battery one need only open the battery drawer 26, remove the old battery, and load a fresh battery within the drawer and close the drawer. If the battery 28 is properly loaded within the battery drawer 26, the battery terminals are correctly connected to the contacts 30 within the housing 20. Conversely, the battery drawer 26 will not close if the battery 28 is improperly loaded within the drawer.

A presently preferred embodiment of the present invention and many of its improvements have been described with a degree of particularity. This description has been made by way of preferred example and is based on a present understanding of knowledge available regarding the invention. It should be understood, however, that the scope of the present invention is defined by the following claims, and not necessarily by the detailed description of the preferred embodiment.

What is claimed is:

1. A battery holder for retaining a battery within a housing of an electrical device and for electrically connecting said battery to said electrical device, said battery having a first end and a second end and further including both a positive terminal and a negative terminal fixed to said first end, said housing defining an opening having a forward edge and a rear edge, and electrical contacts positioned within said housing to contact said positive and negative terminals, said battery holder comprising:
   a battery drawer comprising a rear end wall defining a first aperture adapted to receive said positive terminal and a second aperture adapted to receive said negative terminal;
   means pivotably connecting said battery drawer to said housing within said opening for swinging movement between a closed position in which said drawer is received within said housing, and an open position in which said drawer extends outwardly from said housing for receiving said battery with said positive terminal extending through said first aperture and said negative terminal extending through said second aperture; and
   means biasing said battery towards said rear end wall when said battery drawer swings from said open position to said closed position to maintain said terminals extended through said apertures and effect engagement of said terminals with said electrical contacts.

2. A battery holder as defined in claim 1, wherein said biasing means comprises a cam surface facing said rear end wall of said battery drawer for contacting said second end of said battery within said housing, said cam surface defining an arc that is substantially the same as an arc defined by said second end of said battery when said drawer is moved from said open position to said closed position.

3. A battery holder as defined in claim 1, wherein said battery drawer pivots between said closed position and a maximum open position which is sufficient for said drawer to receive said battery.

4. A battery holder as defined in claim 1, wherein said first aperture is adapted to prevent said negative terminal from being received therein.

5. A battery holder as defined in claim 4, wherein said second end of said battery contacts said housing adjacent said forward edge of said opening to prevent said battery drawer from closing when said positive terminal does not extend through said first aperture.

6. A battery holder as defined in claim 1, wherein said pivotable connecting means comprises a hinge pin fixed to said battery drawer adjacent said rear end wall, and further comprising means retaining said hinge pin within said housing.

7. A battery holder as defined in claim 6, wherein said housing comprises a top shell and a bottom shell joined together, with said bottom shell defining said opening.

8. A battery holder as defined in claim 7, wherein said retaining means comprises a hinge pin retainer fixed to said top shell, said hinge pin retainer including a flat surface facing said bottom shell for supporting said hinge pin, and a hinge pin cover fixed to said bottom shell, said hinge pin cover defining a slot having an open end facing said top shell, said flat surface of said hinge pin retainer engaging said open end of said hinge pin cover upon joinder of said top and bottom shells to pivotably retain said hinge pin within said slot.

9. A battery holder as defined in claim 7, wherein said biasing means comprises a cam surface facing said rear end wall of said battery drawer for contacting said second end of said battery within said housing, said cam surface extending between a first point adjacent said bottom shell and flush with said forward edge of said opening, and a second point adjacent said top shell.

10. A battery holder as defined in claim 1, wherein said battery drawer further includes a bottom wall attached perpendicularly to said rear end wall and a side wall attached perpendicularly to both the bottom wall and the rear end wall, said side wall and said bottom wall defining a contiguous slot which extends parallel to said rear end wall to define a forward section opposite said bottom wall, said side wall including a latch attached to a forward edge of said side wall opposite said rear end wall, said latch adapted to engage said housing adjacent said forward edge of said opening to prevent said battery drawer from opening unintentionally when said drawer is closed.

11. A battery holder as defined in claim 10, wherein said side wall further includes a retaining pin fixed opposite said bottom wall, and wherein said battery drawer pivots between a closed position and a maximum open position sufficient for said battery drawer to receive said battery, said maximum open position defined by contact between said retaining pin and said housing adjacent said opening.

12. A battery holder as defined in claim 10, wherein said slot extends to a terminal point within said side wall, and wherein a resilient hinge portion of said side wall adjacent said terminal point is adapted to be compressed to displace said forward section and said forward edge of said side wall toward said bottom wall to disengage said latch from said housing.

13. A battery holder as defined in claim 12, further including a flange attached to said forward section, said flange extending into said slot toward said bottom wall when said drawer is in said closed position to prevent debris from entering said housing, and said bottom wall further defining a recess for receiving said flange when said resilient hinge portion of said side wall is compressed.

14. A battery holder for retaining a battery within a housing of an electrical device and for electrically connecting a positive terminal and a negative terminal of said battery to electrical contacts within said housing, said housing defining an opening for receiving said battery, said battery holder comprising:

a battery drawer having a rear end wall defining a first aperture adapted to receive said positive terminal and a second aperture adapted to receive said negative terminal;

means pivotably connecting said battery drawer to said housing within said opening for movement between a closed position in which said battery drawer is received within said housing, and an open position in which said battery drawer extends outwardly from said housing for receiving said battery; and means biasing said battery towards said rear end wall when said battery drawer moves from said open position to said closed position to extend said positive terminal through said first aperture and said negative terminal through said second aperture and effect engagement of said terminals with said electrical contacts.

15. A battery holder as defined in claim 14, wherein said first aperture is adapted to prevent said negative terminal from being received therein.

16. A battery holder for retaining a battery within a housing of an electrical device and for electrically connecting said battery to said electrical device, said battery having both a positive terminal and a negative terminal fixed adjacent to one another, said housing comprising a top shell and a bottom shell joined together, said bottom shell further defining an opening having a forward edge and a rear edge, and electrical contacts positioned within said housing to contact said positive and negative terminals, said battery holder comprising:

a battery drawer comprising a bottom wall, a side wall, and a rear end wall attached perpendicularly to one another, and a hinge pin fixed adjacent the juncture of said side wall, said bottom wall and said rear end wall, said rear end wall defining a first aperture adapted to receive said positive terminal and a second aperture adapted to receive said negative terminal;

a hinge pin retainer fixed to said top shell and having a flat surface facing said bottom shell for supporting said hinge pin;

a hinge pin cover fixed to said bottom shell and defining a slot having an open end facing said top shell, said flat surface of said hinge pin retainer engaging said open end of said hinge pin cover upon joinder of said top and bottom shells to pivotably retain said hinge pin within said slot for swinging movement of said battery drawer between a closed position in which said drawer is received within said housing, and an open position in which said drawer extends outwardly from said housing for receiving said battery with said positive terminal extending through said first aperture and said negative terminal extending through said second aperture; and a cam surface extending between a first point within said housing adjacent said bottom shell and flush with said forward edge of said opening, and a second point within said housing adjacent said top shell, said cam surface facing said rear end wall of said battery drawer and contacting said battery when said battery drawer swings from said open position to said closed position to maintain said terminals extended through said apertures and effect engagement of said terminals with said electrical contacts.

17. A battery holder as defined in claim 16, wherein said first aperture is adapted to prevent said negative terminal from being received therein.

18. A battery holder as defined in claim 17, wherein said bottom wall and said side wall of said drawer define a contiguous slot which extends to a terminal point within said side wall, said slot extending parallel to said rear end wall to define a forward section opposite said bottom wall, said side wall further including a latch attached to a forward edge of said side wall opposite said rear end wall, said latch adapted to engage said bottom shell adjacent said forward edge of said opening to prevent said battery drawer from opening unintentionally when said drawer is closed.

19. A battery holder as defined in claim 17, wherein said battery drawer further includes a retaining pin fixed to said side wall, said retaining pin contacting said housing adjacent said opening as said drawer is pivoted between said closed position and said open position to define a maximum open position which is sufficient for said drawer to receive said battery.

20. A battery holder as defined in claim 18, wherein a resilient hinge portion of said side wall adjacent said terminal point is adapted to be compressed to displace said forward section and said forward edge of said side wall toward said bottom wall to disengage said latch from said bottom shell.

21. A battery holder as defined in claim 20, further including a flange attached to said forward section, said flange extending into said slot toward said bottom wall when said drawer is closed to prevent debris from entering said housing, and said bottom wall further defining a recess for receiving said flange when said resilient hinge portion of said side wall is compressed.

* * * * *